United States Patent [19]
Svensson

[11] 3,799,472
[45] Mar. 26, 1974

[54] DEEP SEA FISHING REEL

[75] Inventor: Hugo Ragnvald Svensson, Svangsta, Sweden

[73] Assignee: Abu Aktiebolag, Svangste, Sweden

[22] Filed: July 12, 1971

[21] Appl. No.: 161,547

[30] Foreign Application Priority Data
July 14, 1970  Sweden.............................. 9757/70

[52] U.S. Cl. .............................................. 242/217
[51] Int. Cl............................................. A01k 89/02
[58] Field of Search....... 242/219, 217, 218, 84.5 R, 242/211, 212, 84.51

[56] References Cited
UNITED STATES PATENTS

| | | | |
|---|---|---|---|
| 3,432,114 | 3/1969 | Meisner | 242/219 X |
| 3,233,846 | 2/1966 | Polevoy | 242/217 X |
| 3,017,135 | 1/1962 | Wood, Jr. | 242/218 |
| 1,547,238 | 7/1925 | Russell et al. | 242/218 X |
| 2,182,423 | 12/1939 | Calassa | 242/219 UX |
| 3,478,979 | 11/1969 | Henze | 242/219 X |

Primary Examiner—Billy S. Taylor

[57] ABSTRACT

A fishing reel having a fixed spindle and an axially movable spool. A brake and clutch mechanism comprises a brake disk movable axially into engagement with the spool flange, the reaction forces thereby created being taken up by the spindle through screw elements on the spindle ends. The reel end plates are unloaded by the reaction forces and between them clamp a tubular casing carrying the reel seat and protecting the spool. One end plate is fastened to the spindle by means of a large central nut permitting fast disassembly of the entire reel. A brake force setting lever has a hub journalled on one end of the spool spindle. The inner end of the hub carries a cam surface engaging a cam element axially movable on the spindle to engage a gear wheel, driven by a crank-operated pinion and in turn engaging the brake disk to rotate this and move the brake disk axially into engagement with the spool flange. The braking force can be pre-set by means adjusting the axial position of the spool on the spindle.

4 Claims, 1 Drawing Figure

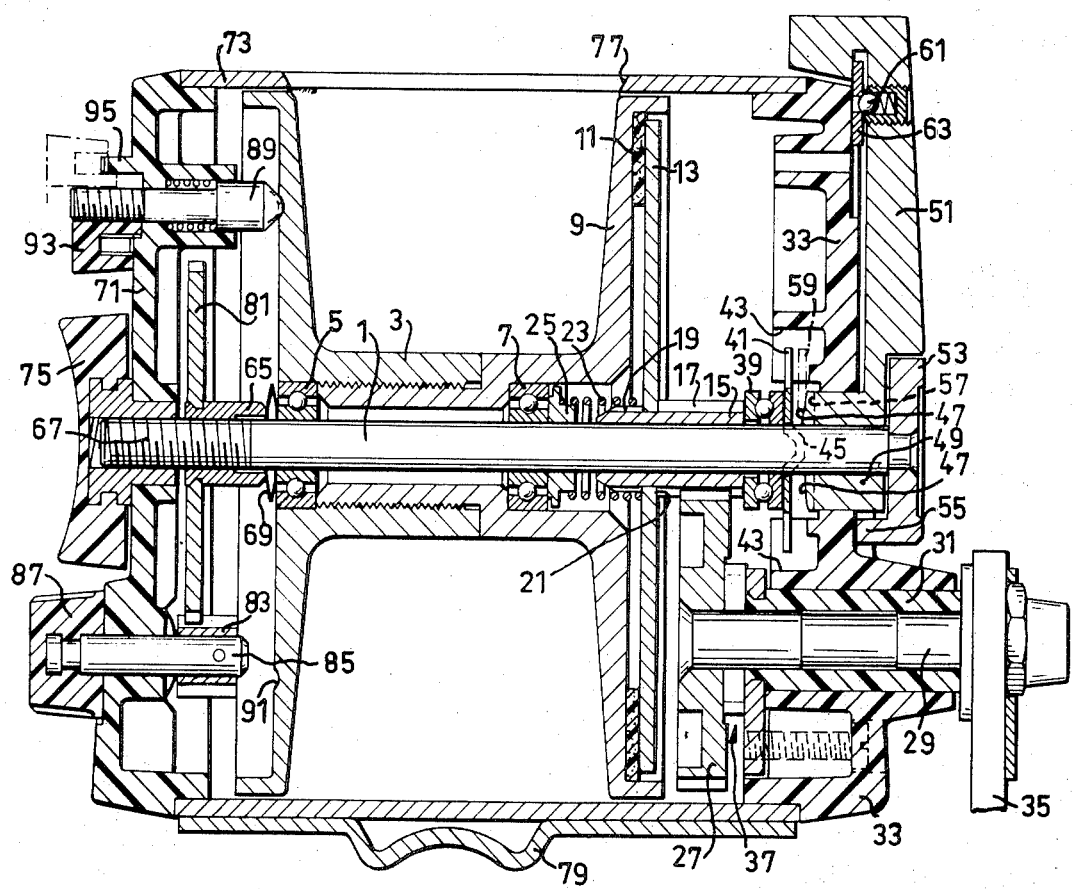

DEEP SEA FISHING REEL

The present invention relates to a spinning reel, and more particularly to a sea-fishing reel of the type which includes a spool mounted for rotation on a spindle and a crank journalled in one end cover wall of the reel and arranged to drive the spool through a gear transmission means and a clutch, and in which one of the end flanges of the spool co-acts with a brake disc coaxially arranged with the flange for selective braking of the spool.

With such reels known hitherto the end cover walls of the reel are connected together by means of a number of posts which are screwed into the end cover walls parallel with one another. Dismantling of such reels is therefore complicated and time consuming. The object of the present invention is accordingly to provide a spinning reel of the aforementioned type which can be dismantled easily.

It is another object of the invention to provide such a reel containing a minimum number of parts.

These objects are achieved by means of the reel according to the present invention which is mainly characterized in that the reel has a stationary undivided spindle and that the spool and the brake disc are mutually axially movable under the action of a displacement mechanism which is actuated by a lever arm located at one end wall of the reel and arranged to urge together, in a manner known per se, the reel flange and the brake disc against the action of a spring at a desired force.

Because the reel has a stationary spindle and because the spool and/or the brake disc are movable on the spindle it is possible to secure the end cover walls of the reel to the spool spindle, thereby enabling the aforementioned posts arranged externally of the periphery of the spool to be omitted.

In accordance with a further aspect of the invention it is possible to completely relieve the end cover walls of axial loads originating from the brake and drive mechanism, by causing the reaction forces caused by the displacement mechanism to be taken up on the spool spindle by means of two load absorbing elements connected to the ends of the spindle and spaced from the end cover walls.

Thus, the end cover plates can be secured with simple attachment means, which do not need to take up inner forces.

The construction of the reel can be considerably simplified and the number of elements reduced by causing the brake disc to be driven by the gear transmission and, together with the spool flange, to form the clutch. In this way the friction connection between the spool and the brake disc has a double purpose. In addition to its function as a friction brake, the connection also forms a fully disconnectable engagement clutch for the drive transmission to the spool.

In accordance with another embodiment of the invention, the mutual axial movement between the spool flange and the brake disc is caused by moving the brake disc in relation to the spool by means of a cam mechanism so arranged that when the lever arm effects a swinging movement the brake disc is moved axially in relation to the spool. The lever arm suitably has a hub mounted on the spindle and extending through the respective end cover wall, while the inner end of the hub is provided with a cam surface which co-acts with a cam surface on a camming element which is movable along the spindle 1 and which actuates the brake disc. Inexpensive but reliable components can be obtained by constructing the camming element as a separate element; for example by constructing the element as a non-rotatably guided plate which, during a camming movement, causes a gear wheel mounted on the spindle to actuate the brake disc.

In accordance with another embodiment of the invention, the camming surface of the cam plate comprises a diametrical ridge projecting out towards the lever hub, while the lever hub presents two diametrically located cam surfaces which rise in the same direction in the direction of the periphery and between which is located a diametrical recess, the width of which is at least equal to the width of the ridge and the bottom of which is located at a level below the lowest portion of the hub cam surface. With this embodiment the same lever arm can be used to apply the brake and to completely disengage the spool from the drive and brake mechanism.

By providing the reel, in addition to the cam mechanism, with a screw setting mechanism comprising a gear wheel which can be turned on the spindle into engagement with a manually actuatable setting pinion mounted adjacent one end cover wall and to thereby move the spool on the spindle it is possible to set the maximum brake force obtained when the lever is fully deflected to a predetermined value. This arrangement is desirable in the majority of fishing reels so that while fishing the maximum braking force can be adjusted to the strength of the line used, for example. By means of the readily accessible brake lever arm it is possible, while fishing, to set the brake to the desired braking force but not to a force which exceeds the pre-selected maximum value.

As an alternative to the cam mechanism for providing mutual axial movement between the spool and the brake disc, the displacement mechanism of the spinning reel according to the present invention may include a gear wheel which can be screwed on the spindle into engagement with a manually rotatable pinion and which, when turning the pinion, causes axial movement between the spool and the brake disc. Moreover, the number of components of the spinning reel can be further reduced by causing the gear wheel to form one of the load absorbing elements of the spool spindle. In this instance the gear wheel and the nut-like attachment means of the end cover wall can be designed to co-act with different parts of a common thread on the end of the spindle, thereby simplifying the manufacture of the spinning reel.

With a suitable construction of the spinning reel according to the invention, the reel may have a tubular casing mounted between the end cover walls, the casing having an opening to permit access to the line wound on the spool, and a foot for securing the reel to a rod. The tubular casing is held clamped between the end cover walls by means of end cover wall attachment means co-acting with the spool spindle.

The invention will now be described in detail with reference to the accompanying drawing which is an axial section of a deep sea fishing reel constructed in accordance with the invention.

The spinning reel illustrated in the drawing is provided with a stationary spindle 1 on which a spool 3 is mounted for rotation by means of ball bearings 5, 7. The spool flange 9 seen to the right of the drawing is provided on its outside surface with an annular cork disc 11 which forms a friction surface for co-operation with a brake disc 13 carried by a gear wheel 15. The teeth 17 of the gear wheel 15 are reduced at the end of the gear wheel as seen to the left of the drawing to a lower level and form splines 19 which non-rotatably connect the gear wheel 15 with the brake disc 13. The brake disc 13 rests axially against abutments 21 formed between the teeth 17 and the splines 19 and is held urged against the abutments 21 by a compression spring 23, one end of which abuts the left side of the brake disc and the other bears against a spring plate 25 mounted on the spindle 1 and bearing against the right hand ball bearings 7.

The gear wheel 15 is in engagement with a gear wheel 27 mounted on a shaft 29 which is mounted in a bushing 31 in the right end wall, bell or web 33 of the reel. The outer end of the shaft 29 supports the crank 35 of the reel. A pawl 37 (not shown in detail) prevents backward rotation of the gear wheel 27.

The gear wheel 15 is axially movable on the reel spindle 1. Bearing against the right hand end of the gear wheel 15 is an axial bearing 39, against the right hand side of which bears a cam plate 41 which is non-rotatably guided in the end wall 33 by reason of the fact that its ends project into recesses 43 disposed in the end cover wall. The cam plate 41 is provided with a transversally extending ridge 45 having sloping sides and shown in the drawing in broken lines. The ridge 45 forms a cam surface which co-acts with two diametrically disposed cam surfaces 47 arranged on the inner end of a hub 49 of a lever 51 which is arranged to swing around the spindle 1 and mounted on the outside of the end plate 33. Movement of the lever arm 51 axially away from the spindle 1 is prevented by an attachment plate 53 securely screwed to one end of the spindle 1. The plate 53 is provided with an axially inwardly extending projection 55, against the end of which bears the right end wall 33.

The inner end of the hub 49 is provided between the two diametrically disposed cam surfaces 47 with a diametrical groove 57 which is of such depth and width that the ridge 45 of the cam plate 41 can snap into the groove 57 when the hub 49 with the lever arm 51 is turned through 90° from the shown position. when the hub is rotated through 90°, the cam plate 41 adopts the position shown by broken lines 59, wherewith the axial bearing 39, the gear wheel 15 and the brake disc 13 are moved to the right to a corresponding degree by the action of the spring 23. Thus, at the right hand end position the brake disc 31 is completely free from the cork ring 11 and the spool 3 is therefore disengaged. When the lever arm 51 is swung from this position in a direction towards the position shown in the drawing, the brake disc 13 is rapidly moved towards a position immediately adjacent the cork ring 11 and is then applied to the cork ring with a force which increases progressively to an extent corresponding to the extent to which the lever arm 51 is moved towards the end position shown in the drawing, in which end position the brake disc 13 and the cork ring 11 are fully engaged.

The lever arm 51 is provided with a ball 61 which is spring biased towards the end wall 33, the ball rolling along a circular race 63 provided with recesses and being located on the end wall 33, to make discernible different setting positions of the lever arm 51.

The braking force applied to the left of the spool 3 is taken up via the left hand ball bearing 5, by a sleeve 65 which is screwed on the threaded left end portion 67 of the spindle 1. Located between the ball bearing 5 and the sleeve 65 are two spring washers 69, arranged to limit the braking force which can be applied by means of the lever arm 51.

The left end wall 71 of the spinning reel is centered around the spindle 1 and rests with its periphery against a tubular casing element 73, the other end of which bears against the periphery of the right end wall 33. By means of a hand-tightenable nut 75 screwed onto the left threaded end portion 67 of the spindle 1, the two end walls 71 and 33 can be tightened against the casing 73, whereupon the right end wall 33 bears against the projection 55 of the plate 53 attached to the spindle 1. The casing 73 is provided with an upper opening 77 through which the line wound on the spool 3 can be reached. At the under side of the casing 73 is mounted a foot 79 for attaching the reel to a rod.

The sleeve 65, which forms the left abutment surface of the reel 3 for the axial movement is adjustable axially on the spindle 1 by means of a gear wheel 81 connected to the sleeve 65 and engaging a pinion 83. The pinion is securely mounted on a shaft 85 journalled in the left end wall 71 and supports on its outside a setting knob 87. Thus, by rotating the knob 87 the sleeve 65 is caused to move axially on the spindle 1, whereby the spool flange and the cork ring 11 are moved in relation to the spindle 1. By means of this axial movement it is possible to change the range of engagement for the brake disc 13 actuated by the cam mechanism and the lever arm 51. The maximum brake force on the spool 3 can therefore be set by means of the knob 87.

Mounted in the left end wall, bell or web 71 is a click mechanism which comprises a spring-biased pin 89 arranged to snap into recesses 91 disposed in the left end wall. The click mechanism can be made inoperative by withdrawing the left end of the pin, said end being provided with a knob 93, and rotating and hooking the pin over a projection 95 in the end wall, this position being indicated by broken lines.

It will be evident from the aforegoing that the spinning reel can be dismantled by removing one single attachment element, i.e., the nut 75. All axial forces which occur when applying the brake are taken up directly by the spindle 1 without the assistance of the end walls and hence it is not necessary for the walls to be designed to meet exacting strength and manufacturing requirements.

The invention is not restricted to the aforedescribed and illustrated embodiments, but can be modified within the scope of the accompanying claims. If, for example, it is not considered necessary to adjust the working range of the lever arm 51 when applying the brake, the screw setting mechanism with the gear wheel 81, 83 and the knob 87 can be omitted. Conversally, the illustrated cam mechanism with cam plate 41 and cam surface 47 and the lever arm 51 can be omitted and setting of the braking force effected through the screw mechanism 81–87, the knob 87 in this instance being suitably formed as a lever arm.

What is claimed is:

1. A fishing reel having a spindle (1), a spool (3), a driven member (15), said spool and said driven member each being axially slidably and rotatably mounted on said spindle, said driven member having means (13)

engageable with said spool to form in engagement therewith a clutch brake device, drive means connected to said driven member to drive said member and said spool in a winding direction, abutment means (53, 69, 65) to retain said spool and said driven member on said spindle, separably operable adjustable means (65, 57, 45) mounted on said spindle to adjustably vary the distance occupied by said spool and said driven member along said spindle between said abutment means to vary the tension and frictional engagement between said spool and said clutch brake device, the first of said separably operable adjustable means comprising a non-rotable member (41, 45) mounted about said spindle and occupying a position therealong outboard of said spool and said driven member, a second member (47, 49) rotatably mounted about said spindle adjacent said non-rotatable member and having engaging cooperating surfaces therewith, at least one of said surfaces forming an axial cam, means to rotate said second member to vary the tension of said clutch brake device, the other of said adjustable means comprising a threaded device (65) threaded on said spindle, a toothed gear (81) on said threaded device, a web (71) secured on said spindle, and a pinnion (83) manually rotatably mounted in said web and engaging said toothed gear whereby the position of said threaded device along said spindle may be selectively adjusted.

2. A fishing reel having a spindle (1), a spool (3) axially slidably and rotatably mounted on said spindle, a driven member (15) axially slidably and rotatably mounted on said spindle, said driven member having means (13) engageable with said spool to form in engagement therewith a clutch brake device, drive means connected to said drivenmember to drive said member and said spool in a winding direction, abutment means (53, 65) to retain said spool and said driven member on said spindle, adjustable means (65, 57, 45) mounted on said spindle to adjustably vary the distance occupied by said spool and said driven member along said spindle between said abutment means to vary the tension of said clutch brake device, a pair of end bells (33, 71) one of said end bells supportively engaged by one of said abutments at one end of said spindle, a nut (75) threaded on the other end of said spindle, the other of said end bells supported on said nut, a tubular casing (73) spaced between said end bells and supportively engaged thereby and surrounding said spindle and spool, and an opening (77) formed in said casing to permit entry of line to said spool.

3. A device substantially as set forth in claim 2 and further characterized in that at least one of said end bells rotatably supports a crank and shaft, a gear carried by said shaft and engaging said driven member.

4. A fishing reel substantially as set forth in claim 2 and further characterized in that at least one of said end bells slidably supports a retractable pin engageable with said spool to make noise upon rotation of said spool.

* * * * *